United States Patent [19]

Kapadia

[11] Patent Number: 4,568,846
[45] Date of Patent: Feb. 4, 1986

[54] PERMANENT MAGNET LAMINATED ROTOR WITH CONDUCTOR BARS

[75] Inventor: Shailesh C. Kapadia, Cincinnati, Ohio

[73] Assignee: Welco Industries, Cincinnati, Ohio

[21] Appl. No.: 546,210

[22] Filed: Oct. 28, 1983

[51] Int. Cl.$^4$ .......................................... H02K 21/12
[52] U.S. Cl. ................................ 310/156; 310/211; 310/216
[58] Field of Search ............... 310/156, 162, 163, 211, 310/216, 261; 310/42, 125, 156, 256, 261

[56] References Cited

U.S. PATENT DOCUMENTS

| | | | |
|---|---|---|---|
| 2,680,822 | 6/1954 | Brainard | 310/156 |
| 3,219,861 | 11/1965 | Burr | 310/156 |
| 3,221,194 | 11/1965 | Blackburn | 310/156 |
| 4,139,790 | 2/1979 | Steen | 310/156 |
| 4,405,873 | 9/1983 | Nondahl | 310/156 |

FOREIGN PATENT DOCUMENTS

| | | | |
|---|---|---|---|
| 1177247 | 1/1970 | United Kingdom | 310/156 |
| 1263300 | 2/1972 | United Kingdom | 310/156 |

*Primary Examiner*—Peter S. Wong
*Assistant Examiner*—D. L. Rebsch
*Attorney, Agent, or Firm*—Kinney and Schenk

[57] ABSTRACT

A permanent magnet rotor has a plurality of high performance permanent magnets supported in each set of a plurality of stacked rotor laminations of magnetic material, with holding laminations at each end of each set of the stacked rotor laminations enclosing the magnets. Bolts extend through aligned holes in all of the laminations to enable nuts to be attached, to form a stacked and bolted assembly. The magnets are preferably radially disposed and equiangularly spaced from each other. A groove is disposed in each of the laminations between a non-magnetic shaft and the inner end of each of the magnets to reduce flux leakage. An electrically conducting and non-magnetic material is disposed at the outer end of each of the magnets, to reduce flux leakage. In another embodiment, four high performance magnets are supported in each set of a plurality of stacked rotor laminations of magnetic material about a magnetic shaft, so that the two separate pairs of magnets of each set cooperate to produce two separate fields of flux.

15 Claims, 12 Drawing Figures

PERMANENT MAGNET LAMINATED ROTOR WITH CONDUCTOR BARS

BACKGROUND OF THE INVENTION

1. Field of the Invention

This invention relates to a permanent magnet rotor for a dynamoelectric machine and, more particularly, to a permanent magnet rotor having high performance magnets arranged in a specific configuration and having particular utility in a synchronous motor.

2. Description of the Prior Art

U.S. Pat. No. 4,139,790 to Steen discloses a synchronous motor having a permanent magnet rotor in which the magnets are Rare Earth magnets. The magnets are arranged so that adjacent magnets cooperate to provide magnetomotive forces in parallel.

The aforesaid Steen patent states that permanent magnet synchronous motors have been manufactured with the magnets disposed in a rotor with the long dimension radially and magnetized circumferentially so that two magnets act in series to supply the flux for a given pole of the rotor. The aforesaid Steen patent states that this arrangement has the disadvantage of the shaft's having to be non-magnetic to avoid flux leakage from one face of the magnet through the shaft and back to the other face of the magnet. The aforesaid Steen patent also sets forth that flux leakage can have a path from one face of the magnet to the other through a magnetic bridge along the periphery of the rotor, to further bleed away flux from the useful flux crossing the air gap to the stator.

The rotor of the present invention has magnets disposed with the long dimension radially and magnetized circumferentially so that adjacent magnets act in parallel to supply the flux for a given pole of the rotor in its preferred embodiment. The rotor of the present invention uses high performance magnets such as Ceramic, Alinco Rare-Earth. While the shaft must be non-magnetic, this is not deemed to be a disadvantage as set forth in the aforesaid Steen patent because of the increased flux produced by the adjacent magnets acting in parallel rather than in series as in the aforesaid Steen patent.

As to leakage flux along its periphery, the rotor of the present invention is formed with very narrow bridges on its periphery. The bridges are narrow, yet optimized to provide added mechanical strength at higher speeds. By forming the bridges very narrow, they saturate at a very low level of flux to prevent further flux leakage along the periphery of the rotor of the present invention. This is accomplished by forming the rotor laminations very thin at the outer periphery and coating each of the rotor laminations with an insulating material to minimize eddy current losses.

Accordingly, in its preferred embodiment, the rotor of the present invention utilizes high performance magnets such as Rare Earth magnets, for example, in a radial arrangement without having all of the disadvantages set forth in the aforesaid Steen patent. This radial arrangement of the high performance magnets enables an easier and less costly assembly. It also results in a higher flux's being produced from the same size magnets than can be obtained from the magnets in the aforesaid Steen patent in which the magnets produce the magnetomotive forces in series rather than in parallel.

In another form, the rotor of the present invention utilizes barrier means of electrically conducting and non-magnetic material between adjacent radially disposed high performance magnets. The barrier means are equally angularly spaced from each other as are the high performance magnets.

In a further modification, the rotor of the present invention has high performance magnets arranged in a non-radial arrangement in which a magnetic shaft can be employed. In this arrangement, four magnets are utilized per section with the four magnets being divided into two pairs of magnets, with each pair creating a pole producing its own flux.

The rotor is utilized in a synchronous motor with a frame, which is preferably formed of extruded aluminum, so as to remove heat from the motor and make it run cooler to thereby produce a longer motor life. Because of the higher efficiency, there is lower loss and therefore less heat, which enables the motor to run cooler.

In assembling the rotor, the magnets are not magnetized until just before the final assembly of the rotor within the motor. This arrangement reduces the cost, since magnets which are magnetized are difficult to assemble, because of the strong attraction of the magnets to each other.

By forming the rotor of high performance magnets and optimizing the length, the application of accidental higher voltage, leaving the rotor out in the open or exposing magnets to a high temperature will not cause demagnetization. Accordingly, the possiblility of the magnets' becoming demagnetized is virtually eliminated.

The rotor of the present invention may be utilized in various configurations while still employing the same shape and size of each of the magnets. Since magnets of only one size need to be stocked to build various size rotors, this substantially reduces the cost.

The radial arrangement of the magnets not only provides an additive flux from the adjacent magnets to boost the performance, but it also provides a reluctant torque. This further increases the performance.

An object of this invention is to provide a permanent magnet rotor using high performance magnets having a very high immunity to demagnetizing forces.

Another object of this invention is to provide a permanent magnet rotor for a synchronous motor having a relatively low operating current with high efficiency, high power factor, and high pull-out torque.

A further object of this invention is to provide a synchronous motor having a frame of high thermal conductivity.

Still another object of this invention is to provide a method for forming an improved permanent magnet rotor.

A still further object of this invention is to provide a method for forming permanent magnet rotors in which demagnetized magnets are utilized during assembly of the rotor.

Other objects, uses, and advantages of this invention are apparent upon a reading of this description, which proceeds with reference to the drawings forming part thereof.

DETAILED DESCRIPTION OF THE PREFERRED EMBODIMENTS

Figure 1:
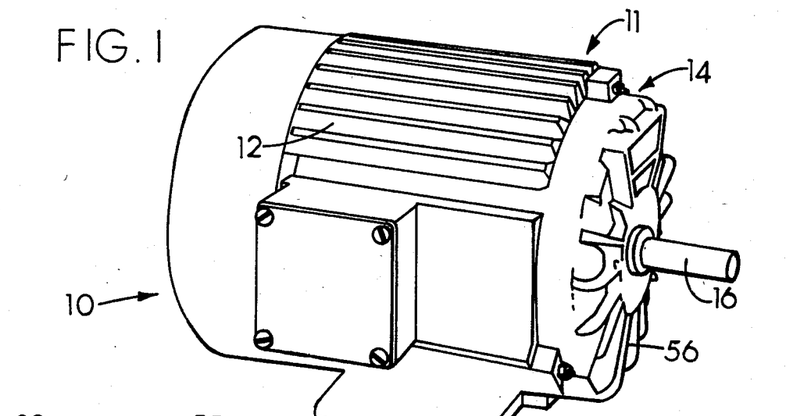
FIG. 1 is a perspective view of the exterior of a synchronous motor having a permanent magnet rotor of the present invention.

Referring to the drawings and particularly FIG. 1, there is shown a synchronous motor 10. The motor 10 includes a frame 11, which is preferably formed of extruded aluminum, so as to have a high thermal conductivity, having fins 12 on a portion of its exterior surface to enable high heat transfer to the ambient.

The motor 10 includes a rear bearing housing 14 secured to one end of frame 11. The motor 10 also has a front bearing frame (not shown) and attached to frame 11. A shaft 16, which is formed of a suitable non-magnetic material, is rotatably supported in rear bearing housing 14 and the front bearing housing (not shown) of motor 10. The shaft 16 is connected to a load (not shown) to be driven by motor 10. The shaft 16 may have a fan (not shown) mounted thereon to cause air to be blown over fins 12. FIG. 1 illustrates an embodiment of motor 10 which uses a fan.

The shaft 16 has a rotor 17 (see FIG. 5) secured on it for rotation. The rotor 17 rotates relative to a stator 18 (see FIG. 2), which is supported in frame 11 (see FIG. 1) in a fixed position. The rotor 17 (see FIG. 2) has its periphery 19 spaced from an inner surface 20 of stator 18 to form an air gap 21 therebetween in the well-known manner.

The rotor 17 includes a plurality of rotor laminations 22, which are annular, of a suitable magnetic material. Each of the rotor laminations 22 is insulated with a suitable insulating material to minimize eddy currents.

Figure 4:
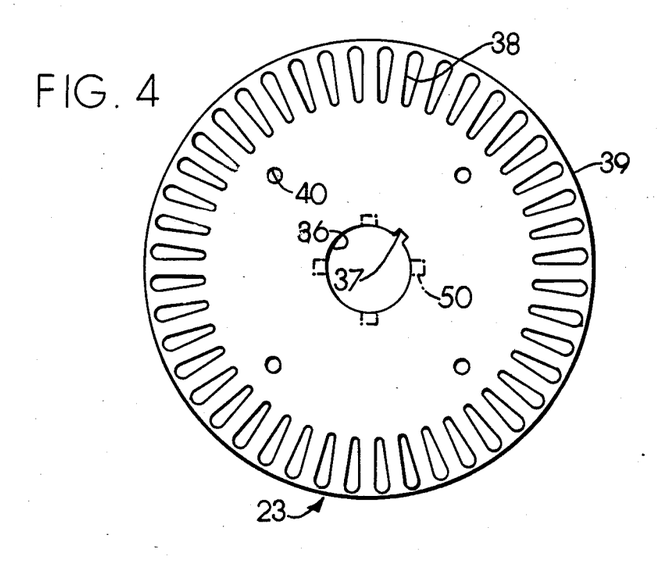
FIG. 4 is an end elevation view of a holding lamination of the permanent magnet rotor of FIG. 2.

The rotor 17 also includes holding laminations 23 (see FIG. 4). The holding laminations 23, which are annular and the same size as the rotor laminations 22 (see FIG. 3), are formed of a suitable non-magnetic material such as stainless steel, for example.

Figures 2, 3:
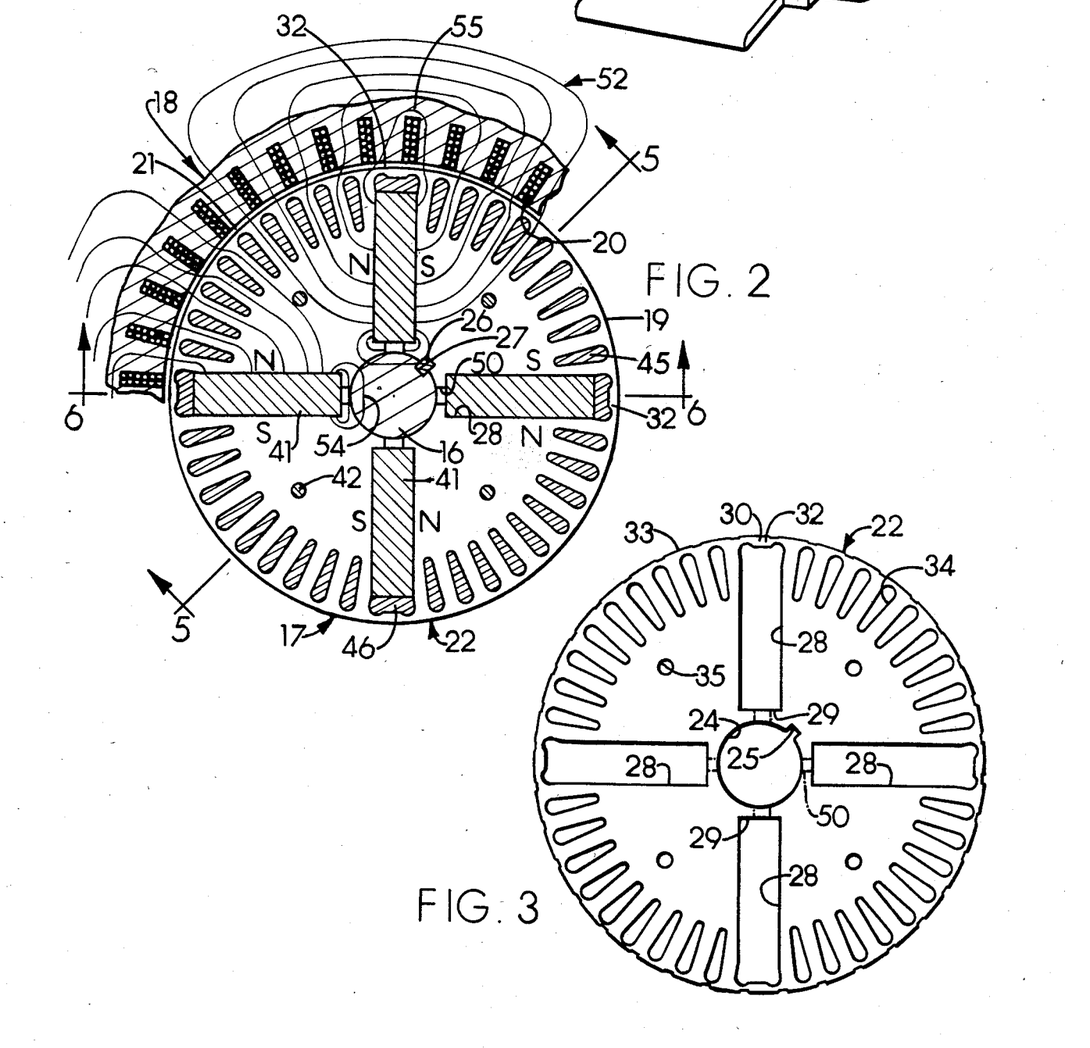
FIG. 2 is a sectional view, partly in elevation, of the permanent magnet rotor of the present invention and part of a stator with which it cooperates and taken along line 2—2 of FIG. 5 as to the rotor.
FIG. 3 is an end elevational view of a rotor lamination of the permanent magnet rotor of FIG. 2.

Each of the rotor laminations 22 has a circular hole or opening 24 at its center to receive shaft 16 (see FIG. 2).

The hole or opening 24 (see FIG. 3) is formed with a keyway slot 25 to enable reception of a key 26 (see FIG. 2) therein and in a keyway slot 27 in the shaft 16 to lock it to rotor laminations 22.

Each of the rotor laminations 22 is identical to the holding lamination 23, except for the four magnet apertures 28 (see FIG. 3) formed therein and radially extending from the center of each. The magnet apertures 28 are equally angularly spaced from each other.

Each of the magnet apertures 28 has its inner end 29 straight and slightly spaced from the circumference of the hole or opening 24.

Each of the rotor laminations 22 has conductor bar apertures or slots 34 optimized for maximizing pull-in torque and minimizing in-rush current formed adjacent the periphery 33 of rotor lamination 22 and around substantially the entire periphery of rotor lamination 22. Each of the conductor bar apertures 34 is disposed on a radius from the center of the rotor lamination 22. One of the conductor bar apertures 34 is radially aligned with keyway slot 25. The bridge 32 is narrow so that it saturates at a relatively low level of flux while still providing adequate mechanical strength.

Each of the rotor laminations 22 has four bolt holes or openings 35. The bolt holes 35 are equally angularly spaced from each other and have their centers disposed on a circle of selected radius so that the bolt holes 35 are interior of conductor bar apertures 34. One of the bolt holes 35 may be radially aligned with keyway slot 25.

As shown in FIG. 4, each of the holding laminations 23 has a circular hole or opening 36 at its center to accommodate the shaft 16 (see FIG. 1). The hole 36 (see FIG. 4) has a keyway slot 37 to receive the key 26 (see FIG. 2) to lock shaft 16 to holding lamination 23 (see FIG.4).

The holding lamination 23 has conductor bar apertures or slots 38 around its entire periphery 39. Each of the conductor bar apertures 38 is of the same size and shape as the conductor bar apertures 34 (see FIG. 3) in the rotor lamination 22. If one of the bolt holes 35 of the rotor laminations 22 is radially aligned with the keyway slot 25, one of the conductor bar apertures 38 (see FIG.4) is radially aligned with the keyway slot 37.

Each of the holding laminations 23 also has four bolts holes 40 with the bolt holes 40 having their centers disposed on a circle of a selected diameter, which is the same as the diameter of the circle on which the centers of the bolt holes 35 (see FIG. 3) in each of the rotor laminations 22 are disposed. The bolt holes 40 (see FIG. 4) are equally angularly spaced from each other and are disposed interior of the conductor bar apertures 38.

The rotor 17 (see FIG. 5) is formed by initially disposing one or more, preferably two, of the holding laminations 23 on a support such as an assembly mandrel (not shown), for example, having a projection to cooperate with the keyway slot 25 (see FIG. 3) in each of the rotor laminations 22 and the keyway slot 37 (see FIG. 4) in each of the holding laminations 23 so that they are stacked in a selected orientation. A plurality of the rotor laminations 22 (see FIG. 5) is then stacked on top of the holding laminations 23 in the same orientation as the holding laminations 23. The number of the rotor laminations 22 in the stack is such as to produce a depth in each of the magnet apertures 28 (see FIG. 3) in the stacked rotor laminations 22 equal to the axial length of a magnet 41 (see FIG. 2), which is to be disposed in the magnet aperture 28 in the stacked rotor laminations 22.

Each of the magnets 41 is formed of a high performance material such as Rare Earth, ceramic, or Alnico material, for example. Each of the magnets 41 is magnetized across its thickness, so as to produce a circumferential polarization when disposed in rotor laminations 22. However, it should be pointed out that the magnets are initially demagnetized, being magnetized only just prior to the final assembly of motor 10.

Each of the magnets 41 is formed of close tolerances so that it has a tight fit with the sides of each of the magnet apertures 28 in which it is disposed. Each of the magnets 41 has its inner end abut the inner end 29 (see FIG. 3) of each of the magnet apertures 28 in which it is disposed.

The dimensions of the magnets 41 (see FIG. 2) are optimized to give the best performance and the lowest cost. Furthermore, the magnets 41 are produced to a specific length, which is normal to the plane of stacked rotor laminations 22. The dimensions of the magnets are such that they can be used as building blocks in any of the configurations.

After the magnets 41, which are demagnetized at this time and are only magnetized at the time of final assembly, have been inserted in the magnet apertures 28 in the rotor laminations 22 of the first stack so as to form a first section 41' (see FIGS. 5 and 6), at least one of the holding laminations 23 (See FIG. 5) is then disposed on top of the uppermost of the stacked rotor laminations 22 in the same orientation. It is preferred that only one of the holding laminations 23 be utilized except for the two pole embodiment illustrated by FIG. 8.

Figure 6:
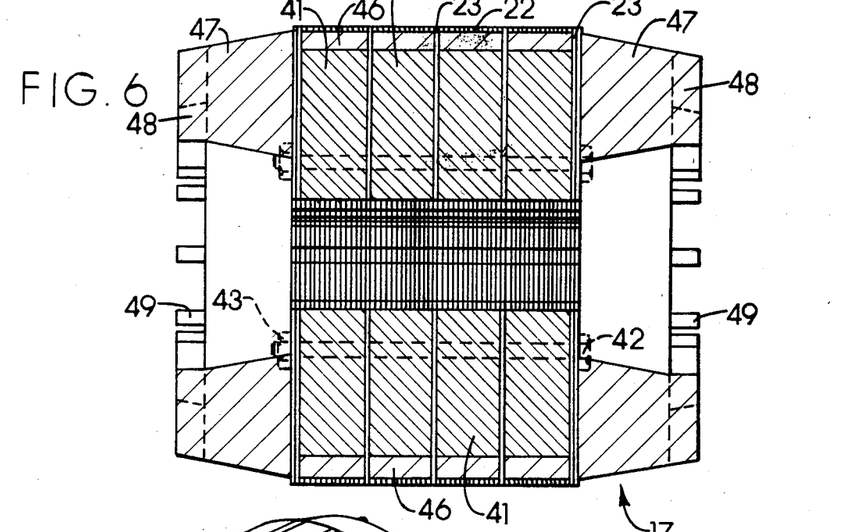
FIG. 6 is a longitudinal sectional view of the permanent magnet rotor of the present invention without it being mounted on its shaft and taken along line 6—6 of FIG. 2.

Then, another stack of the rotor laminations 22 is disposed on top of the holding lamination 23 until the thickness of the stack equals the length of the magnets 41 (see FIG. 2) to be inserted in the magnet apertures 28. This produces a second of the sections 41' as shown in FIG. 6. This stacking arrangement continues until the final set of the magnets 41 has been disposed in the magnet apertures 28 and the required number of the sections 41' are stacked in the rotor laminations 22.

After completion of stacking, four through bolts 42, which are formed of a magnetic material, are inserted in the four bolt holes 40 (see FIG. 4) in the holding laminations 23 and the bolt holes 35 (see FIG. 3) in the rotor laminations 22. Nuts 43 are put on the bolts 42 to squeeze out voids. This securing of the nuts 43 to the bolts 42 retains rotor laminations 22, holding laminations 23, and magnets 41 (see FIG. 6) and the desired assembled relation as a bolted assembly. It should be pointed out that the assembled magnets 41 are still demagnetized.

Figure 5:
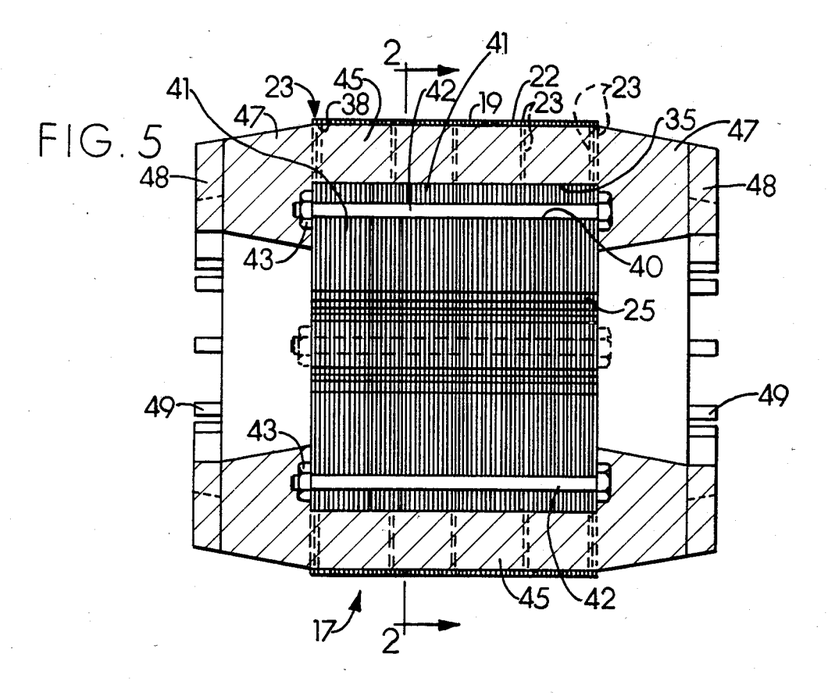
FIG. 5 is a longitudinal sectional view of the permanent magnet rotor of the present invention without its being mounted on its shaft and taken along line 5—5 of FIG. 2 without showing the stator of FIG. 2.

After the nuts 43 are tightened on bolts 42, the bolted assembly is removed from the assembly mandrel and placed in a die (not shown). The die is shaped to enable an electrically conducting and non-magnetic metal such as aluminum, for example, to be cast into the bolted assembly. The metal flows through the conductor bar apertures 38 (see FIG. 4) in the holding laminations 23 and conductor bar apertures 34 (see FIG. 3) in the rotor laminations 22 since they are aligned with each other. As shown in FIGS. 2 and 5, the cast metal forms metallic conductor bars 45, which extend through the conductor bar apertures 38 (see FIG. 4) in the holding laminations 23 and the conductor bar apertures 34 (see FIG. 3) in rotor laminations 22.

The metal also flows into each of the magnet apertures 28 beyond the outer end of the magnet 41 (see FIG. 2) therein to form a flux barrier 46 to prevent flux flow from one face of the magnet 41 within the magnet aperture 28 to the other face of the same magnet 41. The flux barrier 46 also prevents radial movement of each of the magnets 41. Sideways movement of each of the magnets 41 is eliminated by tight tolerance of the magnet 41 in its magnetized direction. The metal flows into the magnet apertures 28 because two of the conductor bar apertures 38 (see FIG. 4) in each of the holding laminations 23 at each of four equally angularly spaced locations are aligned with the outer end 30 (see FIG. 3) of each of the magnet apertures 28.

The die (not shown) is formed so that annular end rings 47 (see FIG. 5) join the ends of conductor bars 45 and bar segments 46 (see FIG. 6). Dimensions of the end ring are optimized for further improvement of pull-in torque capability and lower starting current. Thus, the conductor bars 45 and bar segments 46 form part of a squirrel cage winding which includes end rings 47 (see FIG. 5) for a short circuited secondary winding on rotor 17.

Figures 7, 8:
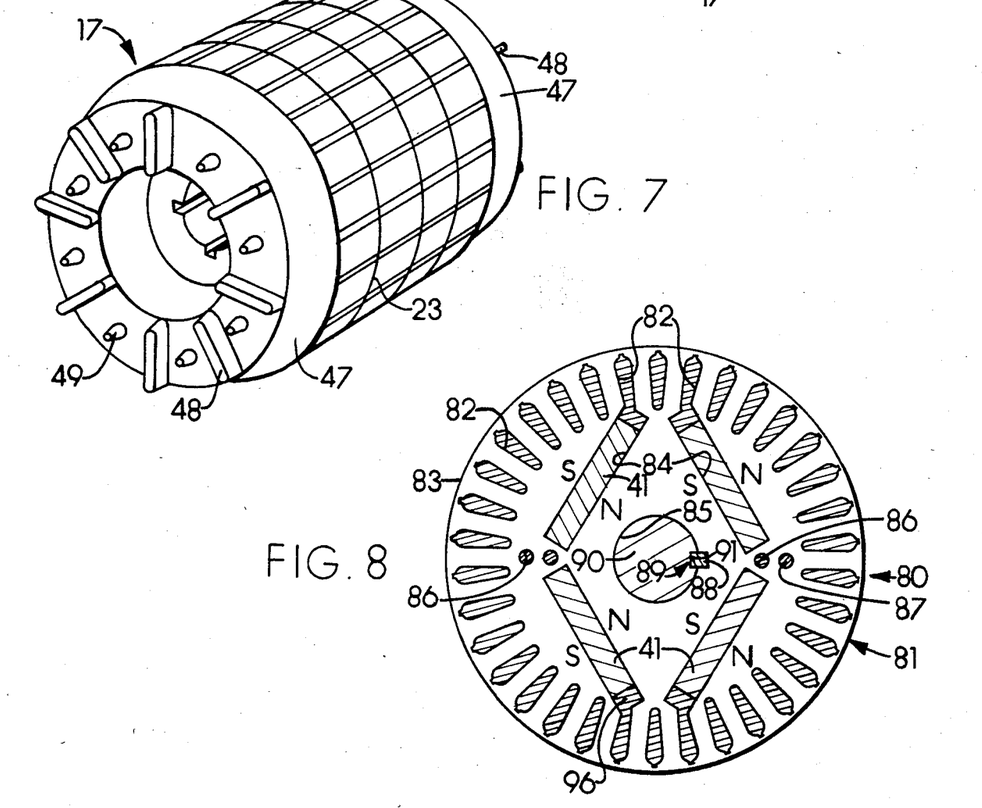
FIG. 7 is a perspective view of the permanent magnet rotor of the present invention without it being mounted on its shaft.
FIG. 8 is a sectional view, partly in elevation, of another embodiment of the permanent magnet rotor of the present invention.

As shown in FIG. 7, each of the end rings 47 includes a plurality of fins 48. When the rotor 17 is disposed within frame 11 (see FIG. 1) of motor 10, the fins 48 (see FIG. 7) enable air to churn within frame 11 (see FIG. 1) to aid in the transfer of heat from stator 18 (see FIG. 2) to frame 11 (see FIG. 1).

Each of the end rings 47 (see FIG. 7) has balancing pegs 49 remaining, as a result of the casting. The pegs 49 are employed to retain washers or equivalents (not shown) for use during balancing of rotor 17.

At completion of casting of the metal, the bolts 42 (see FIG. 5) and nuts 43 are encased within end ring 47. This produces a unitary assembly of the rotor 17.

Upon completion of casting, the rotor 17 is removed from the die (not shown). Then, broaches 50 (see FIG. 2) are cut in each of the rotor laminations 22 and the holding laminations 23 (see FIG. 4).

The broaches 50 (see FIG. 3) are cut from the circumference of circular shaft hole 24 in each of rotor laminations 22 outwardly to the inner end 29 of magnet aperture 28. The broaches 50 extend the same distance in each of the holding laminations 23 (see FIG. 4) from circular shaft hole 36. The broaches 50 form an air gap from shaft 16 (see FIG. 2) to the inner edge of the magnets 41 to reduce flux leakage between the polarized faces of each of the magnets 41. Since the formation of the broaches 50 does not occur until after stacking and casting, there is adequate structural integrity produced by the rotor laminations 22 during assembly. The structural integrity of the rotor 17 is obtained through bolts 42 (see FIG. 5), holding laminations 23, and the cast metal, plus the peripheral bridge 32.

When rotor 17 is disposed within frame 11 (see FIG. 1), the periphery 19 (see FIG. 2) of the rotor 17 is spaced precisely from the stator 18 so that the air gap 21 exists therebetween in the well-known manner. The preferred air gap 21 is between 0.010 and 0.020 inches. With the magnets 41 magnetized so that adjacent faces of the adjacent magnets 41 have the same polarity, each quadrant of the rotor 17 contains the same polarity. Since like poles repel each other and magnetic flux seeks the path of least reluctance, as indicated by flux lines 52 in FIG. 2, most of the magnetic flux is turned outwardly and across air gap 21.

As indicated by flux lines 54, a very small amount of flux tends to flow at the inner end of each of the magnets 41. Because reluctance in this area is at a maximum due to the air gaps, which are created by the broaches 50, and the shaft 16 being of non-magnetic material.

As indicated by flux line 55 at the outer end of each of the magnets 41, flux also tends to flow. However, reluctance is at a maximum at the outer end of the magnets 41 because of the bar segment 46 being of an electrically conducting and non-magnetic metal and the bridge 32 being saturated. Thus, the amount of flux 55 is very small.

As previously mentioned, the frame 11 (see FIG. 1) has fins 12 on it and is preferably formed of extruded aluminum. If a fan (not shown) is utilized, it blows air over the fins 12 to maximize heat transfer, to dissipate the heat from the motor 10 to the ambient. Furthermore, the rear bearing housing 14 has fins 56 to aid in dissipating heat. Accordingly, motor 10 not only has relatively low losses because of extremely high efficiency, but also is able to more readily remove the heat produced by the losses.

While rotor 17 (see FIG. 2) has been illustrated and described as forming four poles so that the motor 10 (see FIG. 1) is a four pole motor, it should be understood that motor 10 may have other pole configurations utilizing the same principals as that of the four pole configuration. For example, a six pole or eight pole arrangement is possible simply by cutting magnet apertures 28 in the rotor laminations of FIG. 3.

Figures 9, 9A, 10, 10A:
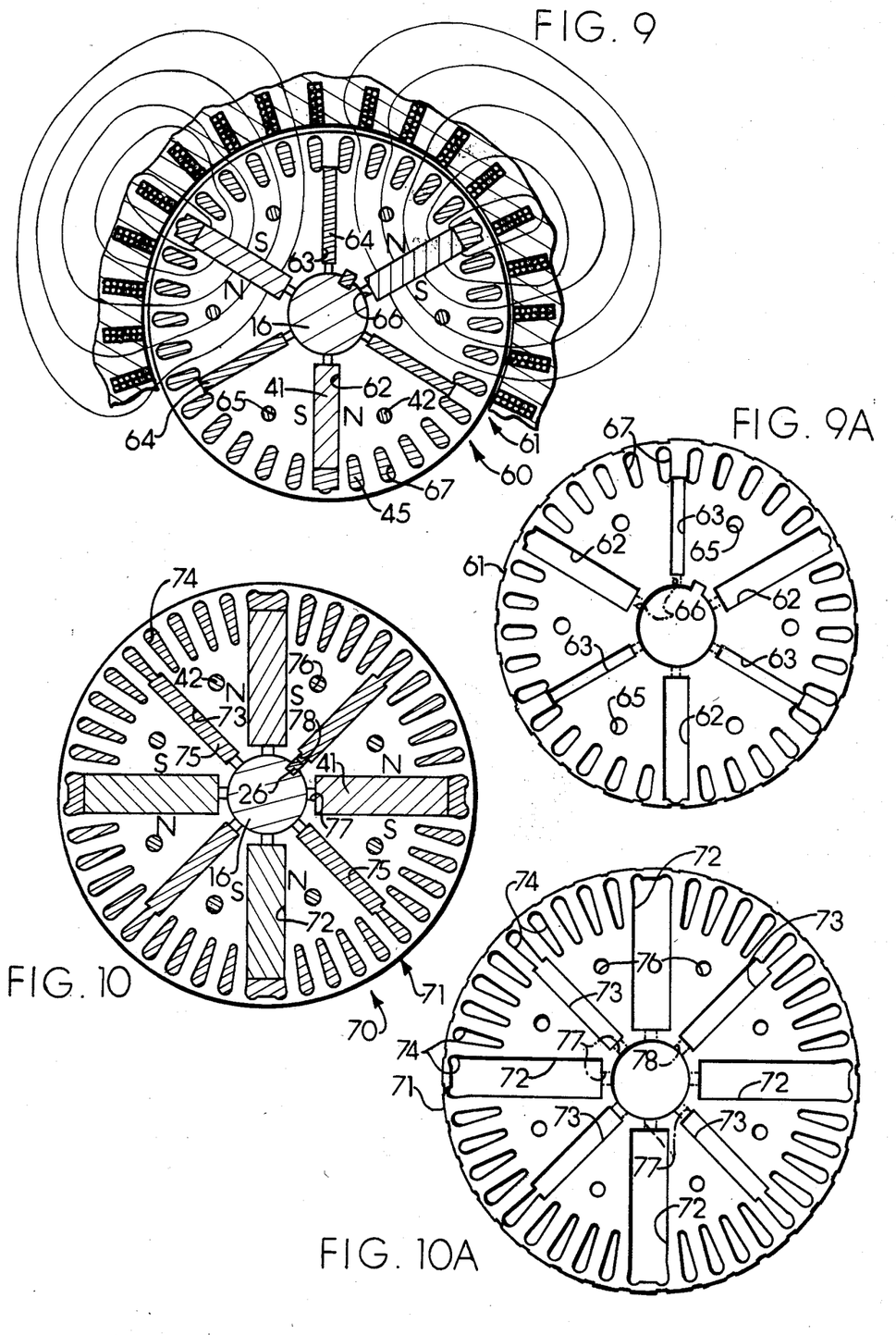
FIG. 9 is a sectional view, partly in elevation, of another modification of the permanent magnet rotor of the present invention.
FIG. 9A is a sectional view, partly in elevation of the rotor laminations of FIG. 9.
FIG. 10 is a sectional view, partly in elevation, of a further embodiment of the permanent magnet rotor of the present invention.
FIG. 10A is a sectional view, partly in elevation of the rotor lamination of FIG. 10.

Referring now to FIGS. 9 and 9A a six pole, three magnet rotor is illustrated.

The rotor 60 includes rotor laminations 61 and holding laminations (not shown). Each of the rotor laminations 61 (see FIG. 9A), which is annular and formed of a suitable magnetic material and insulated to minimize eddy currents, has only three magnet apertures 62 to receive three magnets 41. The magnet apertures 62 are centered between each other and extend radially from the center of each of the rotor laminations 61.

Each of the rotor laminations 61 also has a plurality of barrier apertures 63 radially disposed in the same manner as the magnet apertures 62. Each of the barrier apertures 63 is centered between two of the magnet apertures 62, with the barrier apertures 63 being equally angularly spaced from each other thus producing a consequent pole design. The holding laminations (not shown) are the same as the rotor laminations 61, except that they are formed of a non-magnetic material and do not have magnet apertures 62 or barrier apertures 63.

Each of the barrier apertures 63 has a barrier element 64, which extends for the same length normal to the rotor laminations 61 as each of the magnets 41. The barrier elements 64 are formed of the non-magnetic and electrically conducting metal and are cast at the same time as conductor bars 45.

The barrier elements 64 function to separate flux fields to form the six pole arrangement of rotor 60. In this arrangement, magnets 41 have their adjacent faces, which are separated by one of the barrier elements 64, of opposite polarity. Each of the poles is produced between the face of one of the magnets 41, and faces adjacent barrier elements 64.

Each of the rotor laminations 61 has six bolt holes 65, with each of the bolt holes 65 being equally angularly spaced from each other. The centers of bolt holes 65 are disposed on a circle having the same center as that of rotor lamination 61.

Each of the holding laminations of rotor 60 (see FIG. 9) has six bolt holes, which correspond to the six bolt holes 65 in each of the rotor laminations 61, so as to be able to receive bolts 42 as they pass through bolt holes 65 in each of the rotor laminations 61 of rotor 60.

Each of the rotor laminations 61 has a broach 66 extending between the circumference of the shaft 16 and the inner end of each of the magnets 41. The broaches 66 also extend between the circumference of the shaft 16 and the inner end of each of the barrier elements 64. Thus, the same high reluctance is provided at the inner ends of magnets 41 and barrier elements 64 in rotor 60, to minimize leakage flux.

As shown in FIG. 9 the outer end of each of the barrier apertures 63 comes up into two conductor bar apertures 67 in each of the rotor laminations 61. This enables the cast metal to flow into the barrier apertures 63 during casting since the holding laminations (not shown) do not have any aperture aligned with barrier aperture 63 other than the conductor bar apertures, which are arranged the same as the conductor bar apertures 67 in each of the rotor laminations 61.

Referring to FIG. 10, there is shown a rotor 70 which is formed of stacked rotor laminations 71 and holding laminations (not shown). The rotor 70 (see FIG. 10) is a consequent eight pole rotor.

Each of the rotor laminations 71, which has an annular shape and is formed of a suitable magnetic material which is insulated to reduce eddy currents, has four magnet apertures 72 (see FIG. 10) therein equally angularly spaced from each other. Each of the rotor laminations 71 has four barrier apertures 73 centered between magnet aperture lines 72 and magnetizing the adjacent faces of adjacent magnet 41 of opposite polarity thus forming the consequent eight pole rotor. The barrier apertures 73 are equally angularly spaced from each other and each of the barrier apertures 73 communicates at its outer end with a conductor bar aperture 74 in the rotor lamination 71. Each of the holding laminations (not shown) of rotor 70 is the same as rotor lamination 71, except that it does not have the magnet apertures 72 and the barrier apertures 73 and is formed of a non-magnetic material such as stainless steel, for example.

Thus, during casting, the electrically conducting and non-magnetic metal can flow through the conductor bar apertures, which are arranged the same as the conductor bar apertures 74 in each of the rotor laminations 71, in each of the holding laminations (not shown) and the conductor bar apertures 74 to the barrier apertures 73. This enables barrier elements 75 of the electrically conducting and non-magnetic metal to be formed between each set of the magnets 41.

Each of the rotor laminations 71 has eight bolt holes 76 therein. The bolt holes 76 have their centers disposed on a circle having the same center as that of the center of the rotor lamination 71. The bolt holes 76 are disposed between each of the magnets 41 and the adjacent barrier elements 75.

The bolt holes 76 receive the bolts 42 to secure the stacked rotor laminations 71 and the holding laminations (not shown) to each other.

Each of the rotor laminations 71 (see FIG. 10) has broaches 77 formed after the rotor is cast with suitable material such as aluminum between the circumference of the shaft 16 and the inner end of each of the magnets 41. Three of the four barrier elements 75 also have one of the broaches 77 between the inner end of the barrier element 75 and the circumference of the shaft 16. The fourth of the barrier elements 75 has a keyway slot 78 at its inner end to receive a portion of the key preferably made out of non-magnetic material 26, to lock the rotor laminations 71 to the shaft 16. The remainder of the rotor 70 is the same as the rotor 17 (see FIG. 5).

Referring to FIG. 8, a two pole rotor 80 is illustrated. The rotor 80 is formed of stacked rotor laminations 81 and holding laminations (not shown) in the same manner as the rotor 17 (see FIG. 5). Each of the rotor laminations 81 (see FIG. 8), which is formed of a magnetic material and insulated to reduce eddy currents, has conductor bar apertures 82 extending around its entire periphery 83.

Each of the rotor laminations 81 has four magnet apertures 84 therein to receive the magnets 41 with a relatively tight fit on the sides of the magnet 41 with the outer end of each of the magnets 41 spaced from the outer end of the magnet aperture 84 in which it is disposed along the flux path 93. Each of the magnet apertures 84 communicates at its outer end with the conductor bar aperture of apertures 82.

Each of the rotor laminations 81 has two outside or exterior holes 86 and two interior or inside holes 86'. Each of the outside openings 86 receives a non-magnetic bolt 87 with each of the bolts 87 having a nut (not shown) connected thereto after stacking of the rotor laminations 81 and the holding laminations (not shown) is completed. The inner holes or opening 86' placed at a precise location from the edge of the magnet 41 which receives electrically conducted and non-magnetic metal during casting, form a flux barrier between two faces of each of the magnets 41 adjacent thereto to minimize flux leakage.

The centers of the outer openings 86 and the inner openings 86' are in alignment with a keyway slot 88 in the rotor lamination 81 for receiving a key 89, which is formed of a magnetic material, for keying each of the rotor laminations 81 to a shaft 90, which is formed of a magnetic material, Each of the holding laminations (not shown) of the rotor 80 (see FIG. 8) is the same as the rotor laminations 81 except that the holding laminations do not have the magnet apertures 84 and are formed of a non-magnetic material such as stainless steel, for example. Thus, the holding laminations separate each set 41' from the adjacent set or sets in the same manner as the holding laminations 23 (see FIG. 5) in the rotor 17. The holding laminations also are at the ends of the entire stack of the rotor 80 (see FIG. 10) in the same manner as the holding laminations 23 in the rotor 17 (see FIG. 5).

A flux barrier 96 (not shown in FIG. 8) is formed at the outer end of each of the magnets 41 during casting of the electrical conducting and non-magnetic material. The barrier 96 serves the same purpose as the flux barrier 46 (see FIG. 2) in the rotor 17.

While each of the sections 41' (see FIGS. 5 and 6) of the rotor 17 has four of the magnets 41, it should be understood that one of the sections 41' could have only two of the magnets 41. This would occur when the total required number of magnets 41 would not be a multiple of four such as only 14 of the magnets 41 would be required rather than 16, for example, for a specific configuration. The same concept could be utilized with the rotor 60 of FIG. 9 and the rotor 70 of FIG. 10 so long as the number of magnets per pole pair is balanced around the shaft 16.

While the rotors of the present invention have been shown and described as being used in a synchronous motor, it should be understood that the rotors of the present invention may be utilized in any dynamoelectric machine. Thus, the rotors could be employed in an alternator, for example.

An advantage of this invention is that it prevents flux leakage between magnets. Another advantage of this invention is that the ratio of the horsepower of the motor to its weight is relatively high. A further advantage of this invention is that it also provides additional reluctant torque. Still another advantage of this invention is that it enables a motor to be produced having a high efficiency, a high power factor, a low current, and a higher pull-out torque. A still further advantage of this invention is that it enables a cooler motor to be produced. Yet another advantage of this invention is that it is highly immune to demagnetizing forces. Yet a futher advantage of this invention is that it provides a simple rotor assembly with a single size magnet being utilized for all configurations.

For purposes of exemplification, particular embodiments of the invention have been shown and described according to the best present understanding thereof. However, it will be apparent that changes and modifications in the arrangement and construction of the parts thereof may be restored to without departing from the spirit and scope of the invention.

What is claimed is:

1. A permanent magnet rotor including a shaft rotatable about an axis, at least one set of a plurality of rotor laminations of magnetic material mounted on said shaft in stacked relation for rotation therewith, each of said rotor laminations having a plurality of substantially rectangular magnet apertures therein in a selected arrangement, a substantially rectangular high performance permanent magnet disposed in each of said magnet apertures, each of said magnet apertures having one end closer to said shaft than its other end, at least one holding lamination at each end of each set of said plurality of rotor laminations to retain said magnets within said magnet apertures, each of said holding laminations being formed of a non-magnetic material and being mounted on said shaft for rotation therewith, each of said magnets being magnetized across its thickness and having a length extending through the set of said plurality of rotor laminations greater than its thickness, means to retain said plurality of rotor laminations and said holding laminations together in stacked relation, said retaining means including a plurality of separate means extending through all of said plurality of rotor laminations and said holding laminations substantially parallel to the axis of said shaft and being spaced from each of said magnets and from the periphery of each of said plurality of rotor laminations and each of said holding laminations, each of said plurality of rotor laminations having a plurality of conductor bar apertures around at least substantially the entire periphery thereof, each of said holding laminations having a plurality of like conductor bar apertures around the entire periphery thereof, and metallic conductor means extending through each of said conductor bar apertures in each of said plurality of rotor laminations and the corresponding of said conductor bar apertures in each of said rotor laminations, each of said magnet apertures having its end furthest from said shaft overlapping with at least one of said conductor bar apertures in each of said holding laminations so as to be in communication therewith, said rotor including at least two sets of said plurality of rotor lamirations, each of said sets of said plurality of rotor laminations being separated from each other by at least one of said holding laminations, and said retaining means retaining said sets of said plurality of rotor laminations and said holding laminations together in a stacked relation, the rotor in which four of said magnets are mounted in each of said sets of said plurality of rotor laminations, said four magnets in each of said sets of said plurality of rotor laminations being mounted the same so as to be aligned with said four magnets in each of the other of said sets of said plurality of rotor laminations, said four magnets being symmetrically disposed about the axis of said shaft, each of said four magnets having one end closer to said shaft than its other end, one pair of said four magnets being disposed to cooperate with each other to produce a total magnetomotive force, each of said magnets of said one pair of magnets having one face facing the periphery of each of said plurality of rotor laminations and its other face facing the adjacent face of the other of said one pair of magnets, said one pair of magnets having its adjacent faces of opposite polarity, the other pair of said four magnets being disposed to cooperate with each other to produce magnetomotive forces, each of said magnets of said other pair of magnets having one face facing the periphery of each other of said plurality of rotor laminations and its other face facing the adjacent face of the other of said other pair of magnets, said other pair of magnets having its adjacent faces of opposite polarity, each magnet of said one pair of magnets having its outer face of the same polarity as the outer face of the adjacent magnet of said other pair of magnets, means disposed between the one end of said one pair of magnets and the one end of said other pair of magnets and between the one end of the other of said one pair of magnets and the end of the other of said other pair of magnets to reduce flux leakage therebetween, and each of said magnets having its other end in contact with said metallic conducting means in one of said conductor bar apertures.

2. The rotor according to claim 1 in which each of said high performance permanent magnets is a Rare Earth magnet.

3. The rotor according to claim 1 in which each of said magnet apertures is radially disposed, and said magnet apertures are equally angularly spaced from each other.

4. The rotor according to claim 1 including first means at the inner end of said magnets to reduce flux leakage, and second means at the outer end of each of said magnets to reduce flux leakage.

5. The rotor according to claim 1 in which said first means includes an air gap in each of said plurality of rotor laminations between said shaft and the inner end of each of said magnets, each of said magnets has its outer end terminate prior to the outer end of said magnet apertures, and said second means includes a non-magnetic material disposed in each of said magnet apertures at the outer end of each of said magnets.

6. The rotor according to claim 1 in which said magnets are magnetized so that magnetomotive forces produced from adjacent of said magnets are parallel.

7. The rotor according to claim 1 in which said disposed means includes said retaining means.

8. The rotor according to claim 2 in combination with housing means supporting said rotor therein for rotation about the axis of said shaft, stator means supported in said housing means and surrounding said rotor with an air gap therebetween, said rotor having fin means at each end of said rotor to aid in transfer of heat from said rotor to said housing means, and said housing means having fin means on its exterior to aid in transfer of heat from said housing means to the ambient.

9. The rotor according to claim 1 in which each of said high performance magnets is a Rare Earth magnet.

10. The rotor according to claim 1 in which each of said magnet apertures is radially disposed, each of said magnets is radially disposed, and said magnet apertures are equally angularly spaced from each other.

11. The rotor according to claim 10 including first means at the inner end of each of said magnets to reduce flux leakage, and second means at the outer end of each of said magnets to reduce flux leakage.

12. The rotor according to claim 11 in which said first means includes an air gap in each of said plurality of rotor laminations between said shaft and the inner of each of said magnets, each of said magnets has its outer end terminate prior to the outer end of said magnet apertures, and said second means includes a non-magnetic material disposed in each of said magnet apertures at the outer end of said magnets.

13. The rotor according to claim 12 in which said magnets are magnetized so that magnetomotive forces produced from adjacent of said magnets are parallel.

14. A permanent magnet rotor including a shaft rotatable about an axis, at least one set of a plurality of rotor laminations of magnetic material mounted on said shaft in stacked relation for rotation therewith, each of said rotor laminations having a plurality of substantially rectangular magnet apertures therein in a selected arrangement, a substantially rectangular high performance permanent magnet aperture having one end closer to said shaft than its other end, at least one holding lamination at each end of each set of said plurality of rotor laminations to retain said magnets within said magnet apertures, each of said holding laminations being formed of a non-magnetic material and being mounted on said shaft for rotation therewith, each of said magnets being magnetized across its thickness and having a length extending through the set of said plurality of rotor laminations greater than its thickness, means to retain said plurality of rotor laminations and said holding laminations together in stacked relation, said retaining means including a plurality of separate means extending through all of said plurality of rotor laminations and said holding laminations substantially parallel to the axis of said shaft and being spaced from each of said magnets and from the periphery of each of said plurality of rotor laminations and each of said holding laminations, each of said plurality of rotor laminations having a plurality of conductor bar apertures around at least substantially the entire periphery thereof, each of said holding laminations having a plurality of like conductor bar apertures around the entire periphery thereof, and metallic conductor means extending through each of said conductor bar apertures in each of said plurality of rotor laminations and the corresponding of said conductor bar apertures in each of said rotor laminations, each of said magnet apertures having its end furthest from said shaft overlapping with at least one of said conductor bar apertures in each if said holding laminations so as to be in communication therewith the rotor in which four of said magnets are mounted in said magnet apertures of said plurality of rotor laminations, said four magnets being symmetrically disposed about the axis of said shaft, each of said four magnets having one end closer to said shaft than its outer end, one pair of said four magnets being disposed to cooperate with each other to produce magnetomotive forces, each of said magnets of said one pair of magnets having one face facing the periphery of each of said plurality of rotor laminations and its other face facing the adjacent face of the other of said one pair of magnets, said one pair of magnets having its adjacent faces of opposite polarity, the other pair of said four magnets being disposed to cooperate with each other to produce magnetomotive forces, each of said magnets of said other pair of magnets having one face facing the periphery of each of said plurality of rotor laminations and its face facing the adjacent face of the other of said other pair of magnets, said other pair of magnets having its adjacent faces of opposite polarity, each magnet of said one pair of magnets having its outer face of the same polarity as the outer face of the adjacent magnet of said other pair of magnets, means disposed between the one end of one of said one pair of magnets and the one end of the other of said other pair of magnets to reduce flux leakage therebetween, and each of said magnets having its other end in contact with said metallic conducting means in one of said conductor bar apertures.

15. The rotor according to claim 14 in which said disposed means includes said retaining means.